Figure 1:
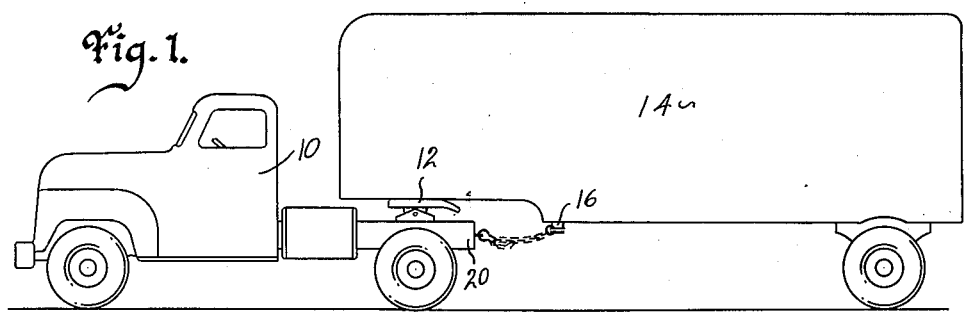

Feb. 9, 1954      R. L. FINCH      2,668,720
ANTIJACKKNIFING DEVICE FOR TRAILERS
Filed Oct. 11, 1952

Inventor
Roy L. Finch
by Talbert Dick & Adler
Attorneys

Witness
Edward P. Sedey

UNITED STATES PATENT OFFICE 2,668,720

ANTIJACKKNIFING DEVICE FOR TRAILERS

Roy L. Finch, Melcher, Iowa

Application October 11, 1952, Serial No. 314,360

10 Claims. (Cl. 280—432)

My invention relates to a safety device designed to prevent trailers from jackknifing when being pulled by a prime mover and is a continuation-in-part of my co-pending case number 138,828, filed January 16, 1950, now abandoned.

Today, the use of large semi-trailers pulled by self-propelled vehicles generally called tractors, is becoming increasingly more popular in the transportation of freight. These trailers are usually large and are capable of carrying a substantial load. They are pivotally secured to the rear of the tractor in a manner that is well known. Because of the comparative ease with which the front end of the trailer will pivot, an ever present danger when such a rig is rolling on the highways is the possibility of the trailer jackknifing. This can be caused by the back wheels of the trailer skidding on a wet or slippery surface so that the trailer moves to a position at right angles to the tractor. If this occurs while the rig is moving, the weight of the trailer will usually force the tractor out of control and can cause serious mishaps. Consequently a means to prevent jackknifing of the trailers would be extremely valuable in preventing damage to property and injury to personnel. In addition to the danger of jackknifing by this type of trailer, there have been occasions when they have become detached from the tractor while in motion. Obviously, this situation is equally as dangerous as jackknifing and in my invention I have provided a means for avoiding such a catastrophe.

It is therefore an object of my invention to provide a safety device to prevent semi-trailers from jackknifing while in motion consisting of a pair of chain members detachably secured at one end respectively on opposite sides at the rear of a tractor and having its other ends attached respectively at opposite ends of an elongated bar that is pivotally secured at its center to the forward underside of the tractor so that the normal position of its longitudinal axis is transversely of the longitudinal axis of the trailer.

A further object of this invention is to provide a safety device of the above type that can be adjusted to increase or decrease the amount of pivotal movement to be permitted by the trailer.

A still further object of this invention is to provide a device for preventing tractors from jackknifing while being moved by a prime mover that can easily and quickly be attached or detached without the use of any tools.

A still further object of my invention is to provide a safety device as above described that will maintain the trailer in tandem contact with the tractor while in motion even though the trailer may have been accidentally released from the hitch on the tractor.

Another object of this invention is to provide a safety device as above described wherein both chains can simultaneously offer a resistance force against the jackknifing of the trailer in either of two directions.

Still other objects of this invention are to provide a safety device of the above classes that is simple in construction, economical in manufacturing and efficient in use.

These and other objects will be apparent to those skilled in the art.

Figure 2:
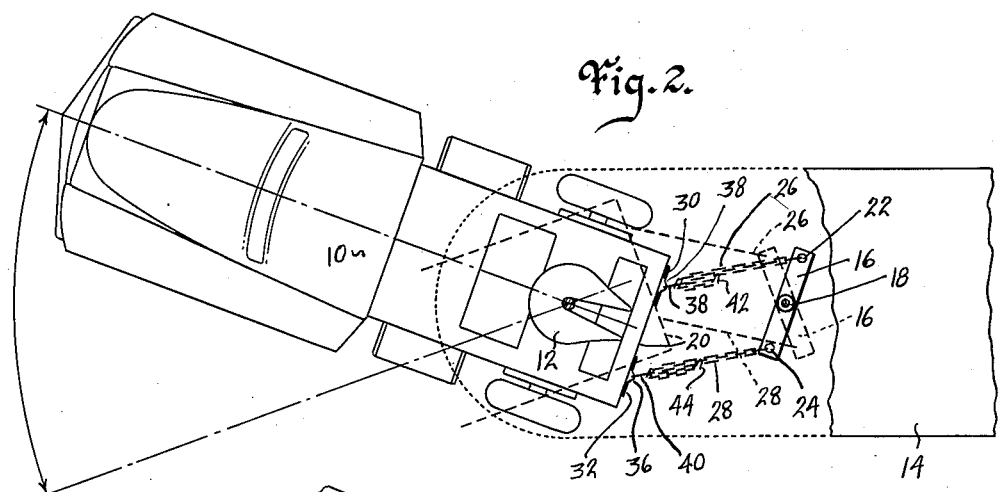
Figure 3:
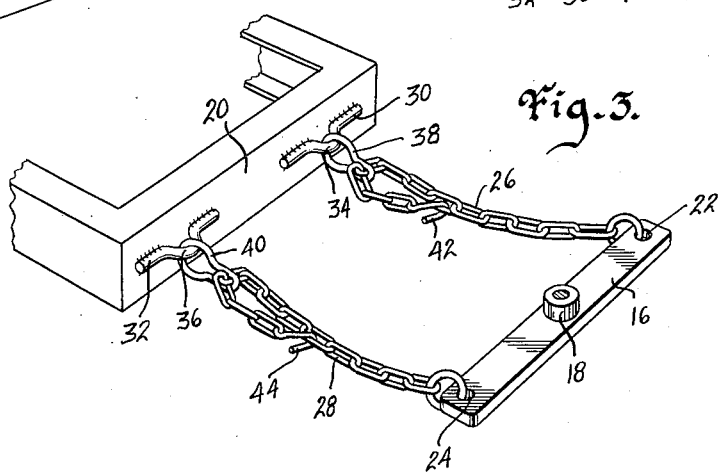

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of a trailer pivotally hitched to a prime mover and shown embodying the use of my safety chains, Fig. 2 is a top view of a trailer pivotally hitched to a prime mover with a portion of the front part of the trailer cut away to more fully illustrate the operation of my safety chains when the prime mover is in the process of making a turn, and Fig. 3 is an enlarged perspective view of my invention shown attached to the rear end frame portion of a prime mover.

Referring to the drawings I have used the numeral 10 to designate a conventional prime mover commonly referred to as a tractor. This tractor 10 generally has a hitch 12 as shown in Fig. 2 to which there is pivotally secured the trailer 14. The use and maneuverability of this type of rig is well known and it is for such a tractor and trailer that my device is adapted and designed. The susceptibility of such a trailer to jackknifing has been previously pointed out and the purpose of my invention is to eliminate this danger.

An elongated bar 16 has a centrally located bearing member 18 by which it is pivotally secured to the underside of the forward portion of the trailer 14 at a point spaced rearwardly of the rear end of the tractor frame 20 and the point of attachment of the bearing member 18 will be at the center of the tractor relative to its width. Holes 22 and 24 respectively are provided in the respective end portions of bar 16 and to each of these there is attached the respective flexible members 26 and 28 which I preferably illustrate as heavy link chains. Normally the longitudinal axis of bar 16 is transversely of the longitudinal axis of the trailer 14 and the chains 26 and 28 extend forwardly in parallel spaced relationship so that their free ends are detachably secured in any suitable manner to the rear of frame 20. For this purpose I have preferably welded to the end of frame 20 at each side the respective rod members 30 and 32 (Fig. 3), each of which has the respective U-bend 34 and 36 that serves as a bracket or hook for the pear shaped links 38 and 40 as shown. The chains 26 and 28 are each passed through one of these links so as to rest in the narrow portion thereof and the free end of each chain is provided with the respective hooks 42 and 44 that are hooked into the chain intermediate links 38 and 40 and bar 16. Links 38 and 40 are of a well known shape and it will be understood that the width of the narrow portion thereof is less than that of the chain links so that the chain cannot move therethrough. Thus this form of link with the attachment of hooks 42 and 44 as described adequately secures the tractor to the trailer for the purposes of this invention. By this arrangement it will be appreciated that the chains are easily removable from the tractor or can be quickly adjusted to allow or take up slack without the use of any tools.

In operation, after the trailer has been hitched to the tractor, chains 26 and 28 are secured as above described and as shown in Figs. 2 and 3. Each chain will be of the same length which can be varied as above pointed out and obviously, the smaller the chain length used, the less pivotal movement will be permitted of the trailer. Sufficient length should be allowed to permit freedom of movement by the trailer around highway curves as illustrated in Fig. 2 and it will be found that on occasion when a sharp turn must be negotiated that it is safer to lengthen or release the chains for that particular occasion only than to adjust the length of the chains to permit such a turn at any time. Such an extreme adjustment would tend to eliminate the usefulness of the chains in preventing jackknifing.

With reference to Fig. 2, the solid lines indicate the action of this invention when the tractor is negotiating a right turn and the broken lines show its position in a left turn. In either turn, bar 16 turns in the same direction on its pivot connection since the outside chain relative to the direction of turn will pull the corresponding end of bar 16 with it. Thus in a right turn, the side of bar 16 to the left of member 18 moves forwardly and the side to the right thereof moves rearwardly in a clockwise direction so that the relative distance between bar 16 sides and the corresponding sides of the rear of frame 20 remains the same. Conversely in a left turn the relative movements described will be reversed. In this action it will be appreciated that the tautness of each chain 26 and 28 remains the same and thus each offers a resistance force at one of the sides of frame 20 against any jackknifing of the trailer. The pivotal movement of bar 16, is, of course, relative to the direction of movement of the tractor and as the tractor straightens out from a turn, bar 16 will return to its normal position illustrated generally in Fig. 3 so that at all times both chains 26 and 28 are in operating position.

As indicated above, there have been occasions when trailers of this type have been known to become accidentally detached from the hitch while in motion. In such a situation damage to the trailer and its cargo is almost inevitable as well as the hazard created for traffic. With my chains in place primarily to prevent jackknifing, however, they would also provide an emergency auxiliary hitch that would serve until the trailer could be rehitched or taken to a place for repairs.

I wish to point out also that while I have illustrated my invention by mounting bar 16 on the trailer or rear vehicle, the same can be mounted on the tractor or leading vehicle with the free chain ends attachable on the trailer without departing from the principle or utility thereof.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my anti-jackknifing device for trailers without departing from the real spirit and purpose of my invention, and it is my intention to cover by my claims, any modified forms of structure or use of mechanical equivalents which may be reasonably included within their scope.

I claim:

1. A pivot limiting device for two vehicles pivotally attached in tandem, comprising, a bar member pivotally secured at its longitudinal center to the pivotally connected end of one vehicle so as to move on its axis in a horizontal plane, a flexible member secured at one end to each respective end of said bar member, and the free end of each of said flexible member detachably secured to the adjacent end of the other vehicle.

2. A pivot limiting device for two vehicles pivotally attached in tandem, comprising, a bar member pivotally secured at its longitudinal center to the pivotally connected end of one vehicle so as to move on its axis in a horizontal plane, a flexible member secured at one end to each respective end of said bar member, the free end of each of said flexible members detachably secured to the adjacent end of the other vehicle, and each of said flexible members independently adjustable as to length.

3. A pivot limiting device for two vehicles pivotally attached in tandem, comprising, a bar member pivotally secured at its longitudinal center to the pivotally connected end of one vehicle so as to move on its axis in a horizontal plane, a flexible member secured at one end to each respective end of said bar member, and the free end of each of said flexible member detachably secured to the adjacent end of the other vehicle so that said flexible members when so secured are of substantially the same length.

4. A pivot limiting device for two vehicles pivotally attached in tandem, comprising, a bar member pivotally secured at its longitudinal center to the pivotally connected end of one vehicle so as to move on its axis in a horizontal plane, a flexible member secured at one end to each respective end of said bar member, and the free end of each of said flexible members detachably secured to the adjacent end of the other vehicle so that said flexible members when so secured are of substantially the same length, whereby each flexible member will have an equal amount of slack when the vehicles are in tandemwise alignment and each will be drawn to substantially the same degree of tautness when the vehicles are turned away from tandemwise alignment.

5. A pivot limiting device for two vehicles pivotally attached in tandem, comprising, a bar member pivotally secured at its longitudinal center to the pivotally connected end of one vehicle so as to move on its axis in a horizontal plane, a flexible member secured at one end to each respective end of said bar member, the free end of each of said flexible member detachably secured to the adjacent end of the other vehicle so that when so secured each is of substantially the same length, each flexible member containing slack when the vehicles are in tandemwise alignment and each being taut when the vehicles are turned away from tandemwise alignment.

6. In combination with a tractor and a pulled trailer pivotally attached thereto, a pivot limiting device, comprising, a bar member pivotally secured at its longitudinal center to the pivotally connected end of the trailer so as to move on its axis in a horizontal plane, a flexible member secured at one end to each respective end of said bar member, and the other end of each of said flexible members detachably secured to the adjacent end of said tractor.

7. In combination with a tractor and a pulled trailer pivotally attached thereto, a pivot limiting device, comprising, a bar member pivotally secured at its longitudinal center to the pivotally connected end of the trailer so as to move on its axis in a horizontal plane, a flexible member secured at one end to each respective end of said bar member, and the other end of each of said flexible members detachably secured to the adjacent end of said tractor in spaced parallel relationship.

8. In combination with a tractor and a pulled trailer pivotally attached thereto, a pivot limiting device, comprising, a bar member pivotally secured at its longitudinal center to the pivotally connected end of the trailer so as to move on its axis in a horizontal plane, a flexible member secured at one end to each respective end of said bar member, and the other end of each of said flexible members detachably secured to the adjacent end of said tractor in spaced parallel relationship so that when so secured each is of substantially the same length, each flexible member containing slack when the vehicles are in tandemwise alignment and each being taut when the vehicles are turned away from tandemwise alignment.

9. A pivot limiting device for two vehicles pivotally attached in tandem, comprising, a bar member pivotally secured at its longitudinal center to the pivotally connected end of one vehicle so as to move on its axis in a horizontal plane, a flexible member secured at one end to each respective end of said bar member, the free end of each of said flexible members detachably secured to the adjacent end of the other vehicle in spaced parallel relationship so that when so secured each is of substantially the same length, each flexible member containing slack when the vehicles are in tandemwise alignment and each being taut when the vehicles are turned away from tandemwise alignment, and said flexible members maintaining their parallel spaced relationship irrespective of the relative positions of said vehicles.

10. In combination with a tractor and a pulled trailer pivotally attached thereto, a pivot limiting device, comprising, a bar member pivotally secured at its longitudinal center to the pivotally connected end of the trailer so as to move on its axis in a horizontal plane, a flexible member secured at one end to each respective end of said bar member, and the other end of each of said flexible members detachably secured to the adjacent end of said tractor in spaced parallel relationship so that when so secured each is of substantially the same length, each flexible member containing slack when the vehicles are in tandemwise alignment and each being taut when the vehicles are turned away from tandemwise alignment, and said flexible members maintaining their parallel spaced relationship irrespective of the relative positions of said tractor and trailer.

ROY L. FINCH.

References Cited in the file of this patent
UNITED STATES PATENTS

| Number | Name | Date |
|---|---|---|
| 1,211,825 | Curl | Jan. 9, 1917 |
| 2,252,135 | Oyler | Aug. 12, 1941 |
| 2,612,382 | Landis | Sept. 30, 1952 |